United States Patent
Nishimiya

(10) Patent No.: US 7,613,940 B2
(45) Date of Patent: Nov. 3, 2009

(54) METHOD AND APPARATUS FOR CONTROLLING POWER SUPPLY TO RECORDING DEVICES OF REDUNDANT-ARRAY-OF-INDEPENDENT-DISKS GROUP

(75) Inventor: Ryohei Nishimiya, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 443 days.

(21) Appl. No.: 11/412,781

(22) Filed: Apr. 28, 2006

(65) Prior Publication Data

US 2007/0168682 A1    Jul. 19, 2007

(30) Foreign Application Priority Data

Jan. 16, 2006  (JP) .............................. 2006-007553

(51) Int. Cl.
*G06F 1/26*    (2006.01)
(52) U.S. Cl. ......................................... 713/300; 714/14
(58) Field of Classification Search ................. 713/300; 714/6, 14
See application file for complete search history.

(56) References Cited

U.S. PATENT DOCUMENTS

| | | | |
|---|---|---|---|
| 6,816,981 B2 * | 11/2004 | Morita et al. ................... | 714/6 |
| 6,986,075 B2 * | 1/2006 | Ackaret et al. .................. | 714/4 |
| 7,047,427 B2 * | 5/2006 | Suzuki et al. ............... | 713/300 |
| 7,284,140 B2 * | 10/2007 | Suzuki et al. ............... | 713/340 |
| 7,320,093 B2 * | 1/2008 | Yagi ............................. | 714/50 |

FOREIGN PATENT DOCUMENTS

| | | |
|---|---|---|
| JP | 2-81124 | 3/1990 |
| JP | 3-224022 | 10/1991 |
| JP | 7-288930 | 10/1995 |
| JP | 2000-11632 | 1/2000 |
| JP | 2003-162380 | * 6/2003 |
| JP | 2005-190052 | 7/2005 |

* cited by examiner

*Primary Examiner*—Chun Cao
(74) *Attorney, Agent, or Firm*—Fujitsu Patent Center

(57) ABSTRACT

A power supply unit supplies power for each of a plurality of power supply groups configured to supply the power to a first recording device that belongs to a first redundant-array-of-independent-disks group and a second recording device that belongs to a second redundant-array-of-independent-disks group. The second redundant-array-of-independent-disks group includes recording devices different from those of the first redundant-array-of-independent-disks group. A power-supply control unit cuts off, when a malfunctioning occurs in a specific recording device, power supply to a power supply group that includes the specific recording device.

4 Claims, 4 Drawing Sheets

METHOD AND APPARATUS FOR CONTROLLING POWER SUPPLY TO RECORDING DEVICES OF REDUNDANT-ARRAY-OF-INDEPENDENT-DISKS GROUP

BACKGROUND OF THE INVENTION

1. Field of the Invention

The present invention relates to a technology for controlling power supply to a plurality of recording devices of a redundant-array-of-independent-disks (RAID) group.

2. Description of the Related Art

A power supply unit a device enclosure (DE) that includes a plurality of hard disk drives (HDDs), to supply power required to operate the HDDs. The power supply unit typically includes a protection circuit for a self shutdown when a malfunction occurs in the HDD (such as a short circuit or overcurrent). FIG. 3 is a schematic for illustrating HDDs that are stored in a conventional DE and power supply units. As shown in FIG. 3, a DE 10 includes HDDs 0 to n (n is a positive integer). Power supply units 20 and 30 supply power to each of the HDDs 0 to n. The HDDs 0 to n are linked to each other to compensate redundancy and constitute a RAID.

However, if a malfunction occurs in an HDD (for example, HDD 4) among the HDDs 0 to n, the power supply units 20 and 30 performs the self shutdown. In other words, as shown in FIG. 3, because a power supply system inside the DE 10 is common to all the HDDs 0 to n, power supply not only to the HDD 4 that is malfunctioning but also to other normal HDDs is cut off, thereby resulting in a shutdown of the entire DE 10 that includes other volumes of data. Particularly, in a small-scale RAID system that includes only the DE 10, the shutdown of the entire DE 10 results in immediate system shutdown and data loss, thereby affecting reliability.

To solve the above problem, a method has been proposed in which a power-off circuit that blocks power is provided in each slot (entry point of the HDD) of the DE. FIG. 4 is a schematic for illustrating a construction in which the power-off circuit is provided in each slot of the DE. As shown in FIG. 4, because power-off circuits 50 to 65 are connected to each slot of a DE 40, even if a malfunction occurs in a specific HDD, the corresponding power-off circuit can block power supply only to the malfunctioning HDD, thereby enabling to prevent the shutdown of the entire DE 40.

For example, if a malfunction occurs in an HDD 3, a power-off circuit 53 blocks the power supply to the HDD 3, retaining the power supply to other HDDs, thereby preventing shutdown of the entire DE 40.

In a technology disclosed in Japanese Patent Application Laid-Open No. 2005-190052, a plurality of HDDs included in a motherboard is mounted on a chassis and a single high voltage is supplied to each chassis, thereby enabling to mount multiple types of HDDs on the motherboard.

However, as shown in FIG. 4, connecting the power-off circuit to each slot of the DE 40 results in a waste of a large number of power-off circuits. This is because the number of HDDs that are mounted inside the DE varies according to structure of the device, and the number of the HDDs may be smaller than the number of the slots. In the example shown in FIG. 4, since the DE 40 includes only HDDs 0 to 5, power-off circuits 56 to 65 are wasted.

The power supply to each HDD can also be controlled by incorporating a power-off circuit for each HDD into the power supply unit. However, this increases size and complexity of the power supply unit, thereby increasing cost.

SUMMARY OF THE INVENTION

It is an object of the present invention to at least solve the problems in the conventional technology.

An apparatus according to one aspect of the present invention is for controlling power supply to recording devices of a redundant-array-of-independent-disks group. The apparatus includes a power supply unit that supplies power for each of a plurality of power supply groups configured to supply the power to a first recording device that belongs to a first redundant-array-of-independent-disks group and a second recording device that belongs to a second redundant-array-of-independent-disks group, the second redundant-array-of-independent-disks group including recording devices different from those of the first redundant-array-of-independent-disks group; and a power-supply control unit that cuts off, when a malfunctioning occurs in a specific recording device, power supply to a power supply group that includes the specific recording device.

A method according to another aspect of the present invention is for controlling power supply to recording devices of a redundant-array-of-independent-disks group. The method includes supplying power for each of a plurality of power supply groups configured to supply the power to a first recording device that belongs to a first redundant-array-of-independent-disks group and a second recording device that belongs to a second redundant-array-of-independent-disks group, the second redundant-array-of-independent-disks group including recording devices different from those of the first redundant-array-of-independent-disks group; and cutting off, when a malfunctioning occurs in a specific recording device, power supply to a power supply group that includes the specific recording device.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained in detail below with reference to the accompanying drawings.

According to the present invention, HDDs that are stored in a DE are divided into multiple groups, and the power is performed for each of the groups. Furthermore, the RAID is configured with HDDs not from a single group but from multiple groups. In other words, a structure of a group for performing the power supply is different from that of the RAID group.

In this manner, according to the present invention, the HDDs that are stored in the DE are divided into multiple groups to carry out power supply, and the RAID includes the HDD that are included in the divided groups. Thus, even if malfunction occurs in any of the HDD, access to the HDD of other groups is continued. The power supply is performed for each group, thereby enabling to reduce the number of power-off circuits and enabling to significantly reduce cost in comparison with a method that includes a power supplying and blocking circuit for each HDD.

Figure 1:
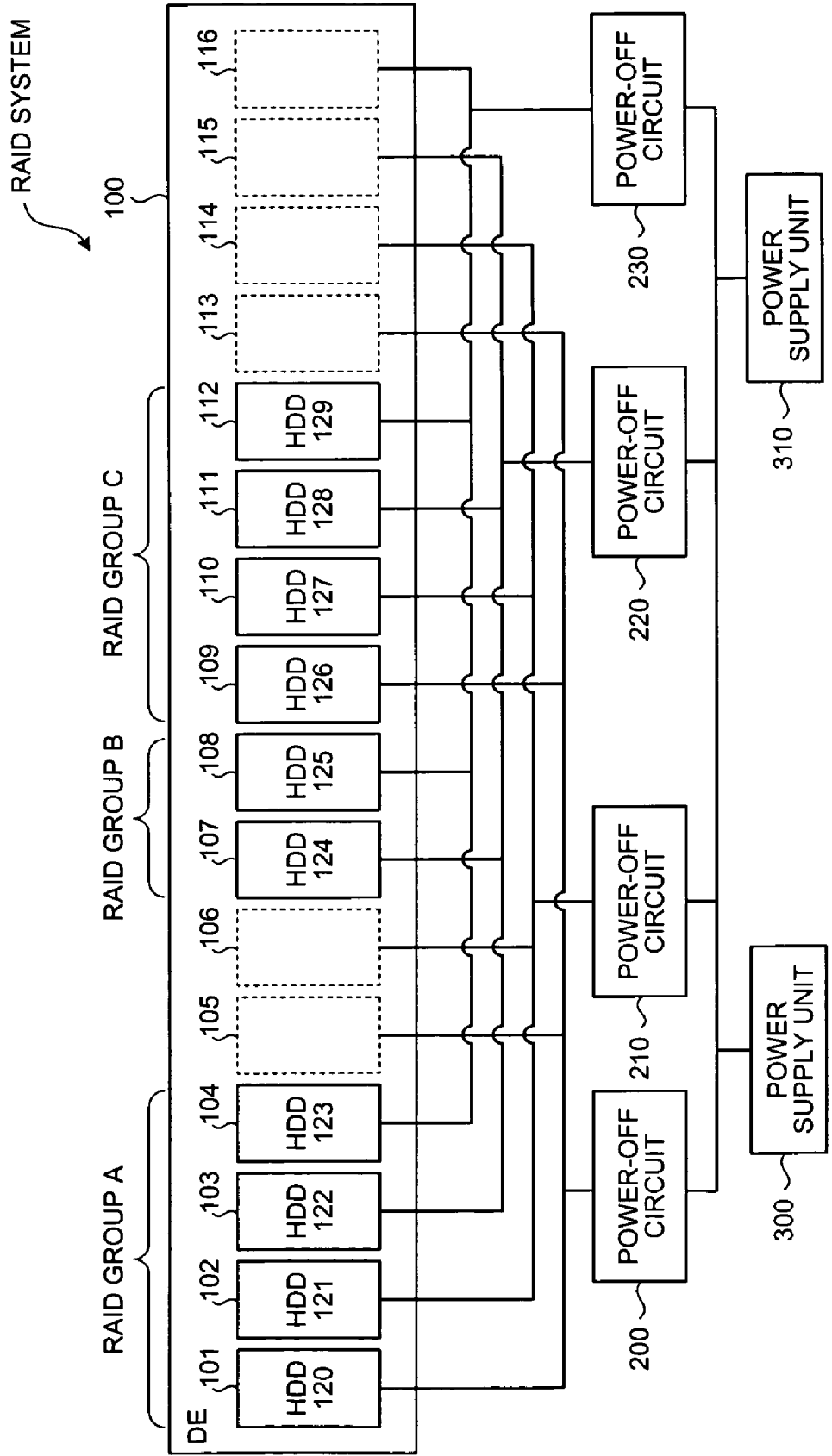
FIG. 1 is a block diagram of a RAID system according to an embodiment of the present invention.

FIG. 1 is a block diagram of a RAID system according to an embodiment of the present invention. The RAID system according to the present embodiment includes a DE 100, power-off circuits 200 to 230, and power supply units 300 and 310.

The DE 100 is a module (chassis) that includes multiple HDDs and includes slots 101 to 116 for connecting the HDDs. By connecting the HDD to the slots 101 to 116 that are included in the DE 100 enables the HDD to receive power supply from the power supply units 300 and 310.

As shown in FIG. 1, HDDs 120 to 123 are connected to slots 101 to 104 of the DE 100, respectively, and HDDs 124 to 129 are connected to slots 107 to 112, respectively. The HDDs 120 to 123 are included in a RAID group A. The HDDs 124 and 125 are included in a RAID group B. The HDDs 126 to 129 are included in a RAID group C. The DE 100 is connected to a not shown host computer and carries out writing and reading of data in response to a request from the host computer.

If malfunction such as short circuit in power supply or over current occurs in an HDD that is connected to a power supply destination slot, the power-off circuits 200 to 230 cut off power supply to the slots that are connected to the corresponding power-off circuit. As shown in FIG. 1, the power-off circuit 200 is connected to slots 101, 105, 109, and 113. A power-off circuit 210 is connected to slots 102, 106, 110, and 114. A power-off circuit 220 is connected to slots 103, 107, 111, and 115. The power-off circuit 230 is connected to slots 104, 108, 112, and 116.

Thus, the power-off circuits 200 to 230 carry out power supply for each group that includes the HDD from each of the three RAID groups A, B, and C (the RAID groups and the groups for carrying out power supply are different from each other), thereby enabling to continue access to the RAID groups A, B, and C even if malfunction such as short circuit in power supply or over current occurs in any HDD and power supply to the group that includes the malfunctioning HDD is cut off.

For example, if malfunction occurs in the HDD 121, the power-off circuit 210 detects the malfunctioning HDD 121 and cuts off power supply to the slots 102, 106, 110, and 114. However, only the HDD 121 and 127 are shut down due to the malfunction. All the HDD except one HDD in the RAID groups A and C continue to be accessible, and the RAID group B can continue to operate regardless of the malfunctioning HDD 121.

The power supply units 300 and 310 supply power to the slots 101 to 116 via the power-off circuits 200 to 230.

Thus, in the RAID system according to the present embodiment, the HDD 120 to 129 mounted on the DE 100 are divided into multiple groups, and the power-off circuits 200 to 230 supply or cut off power to each of the groups. A RAID group in the RAID system does not include the HDD affiliated to a single power supply group. The RAID group includes HDD that are included in multiple power supply groups, thereby enabling to access the RAID groups that are set inside the DE 100 even if an HDD included in the DE 100 suffers a breakdown.

The power-off circuits 200 to 230 supply or cut off power to each group, thereby enabling to reduce the number of the power-off circuits and enabling to significantly reduce the cost in comparison with the method that includes a power supplying and blocking circuit for each HDD.

Figure 2:
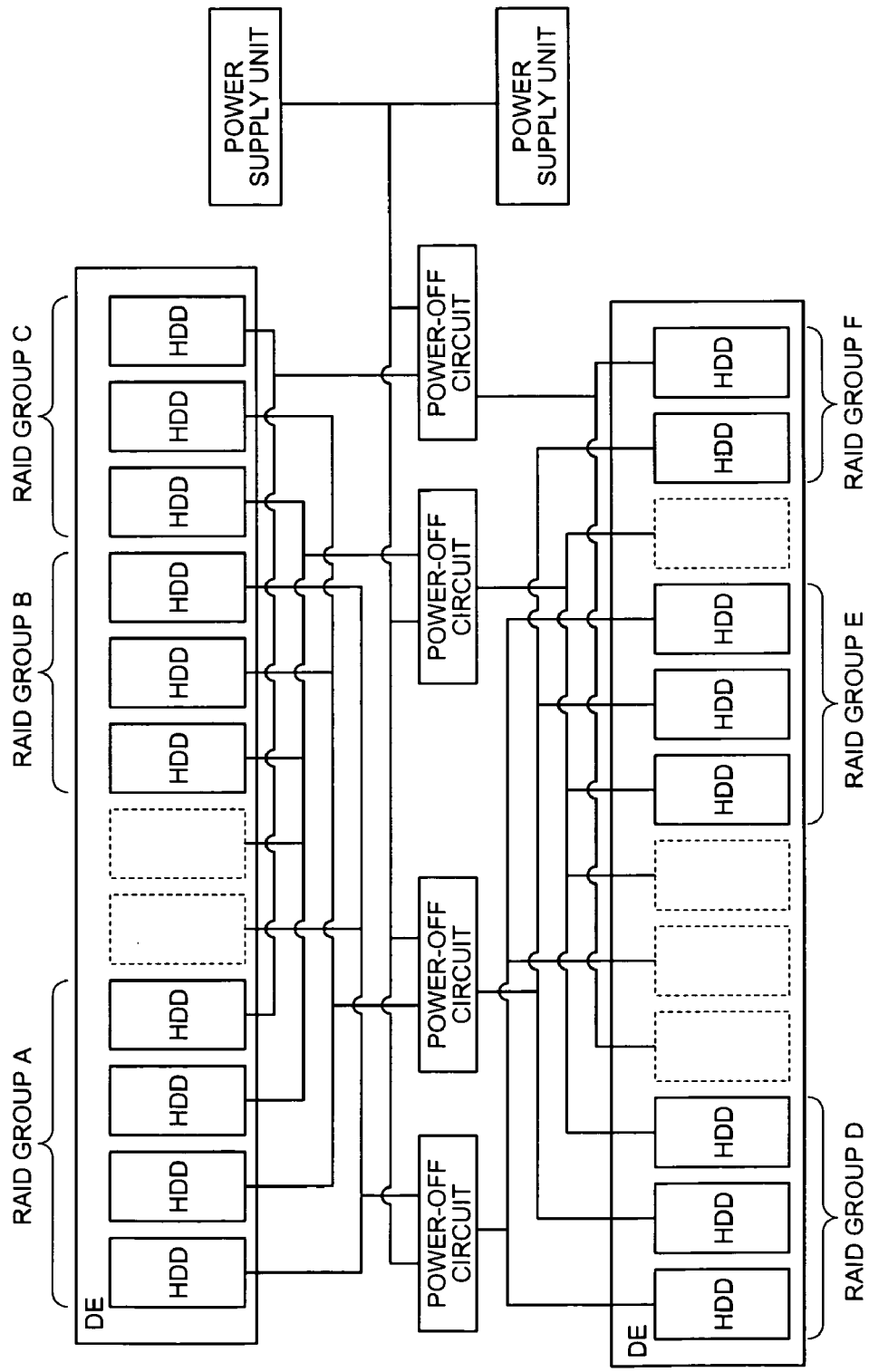
FIG. 2 is a schematic for illustrating an application of the present invention.
Figure 3:
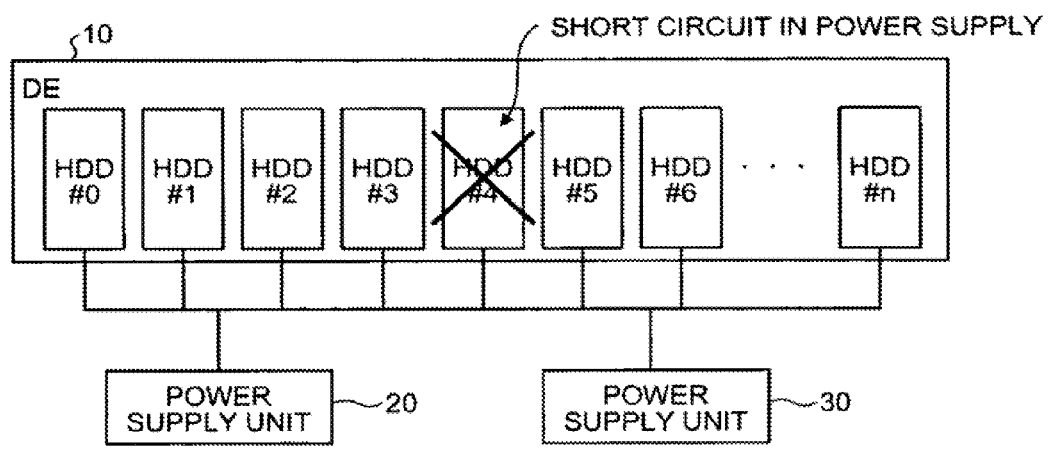
FIG. 3 is a schematic for illustrating HDDs that are stored in a conventional DE and power supply units.
Figure 4:
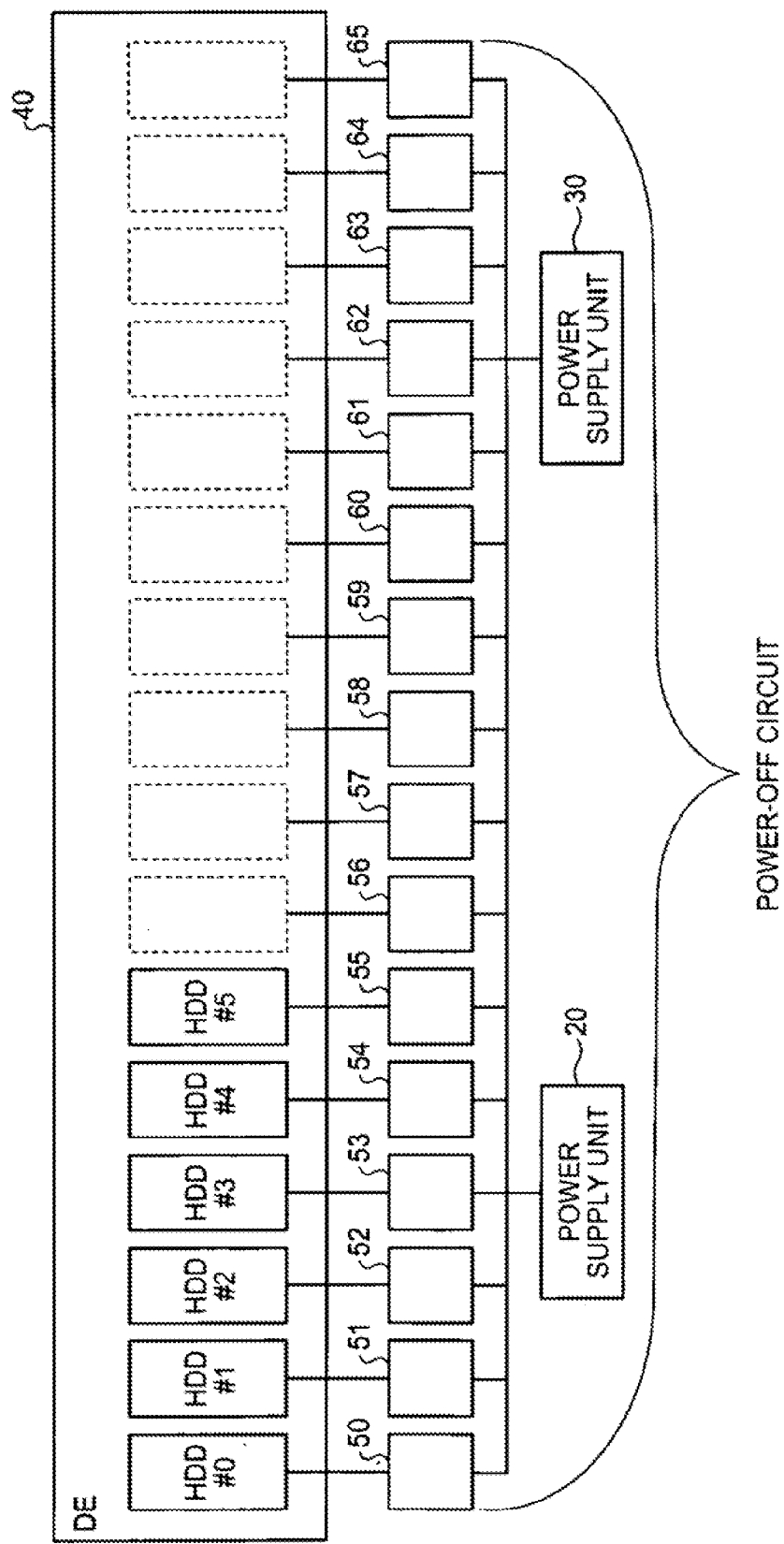
FIG. 4 is a schematic for illustrating a construction in which a power-off circuit is provided in each slot of the DE.

An example of the RAID system that includes a single DE has been explained with reference to FIG. 1. However, the present invention is not to be limited to the RAID system that includes only a single DE, and can be applied to RAID systems having various structures. FIG. 2 is a schematic for illustrating an application of the present invention. As shown in FIG. 2, each power-off circuit is connected such that the power-off circuit includes HDD from RAID groups A to F, thereby enabling to access the RAID included in each DE even if malfunction occurs in any HDD.

According to an embodiment of the present invention, power is supplied to each power supply group that includes different recording devices than a RAID group that includes multiple recording devices. If power malfunction such as short circuit in power supply or overcurrent, etc. occurs in a recording device, power supply to the power supply group that includes the malfunctioning recording device is cut off, thereby enabling to prevent simultaneous shutdown of recording devices affiliated to other power supply groups, and enabling to prevent shutdown of the entire system that includes the RAID groups.

Furthermore, according to an embodiment of the present invention, power supply groups exist in multiple numbers. If malfunction occurs in a recording device, power supply to the power supply group that includes the malfunctioning recording device is cut off and power supply to the other power supply groups that do not include the malfunctioning recording device is continued, thereby enabling to minimize the scale of power controlling circuits and significantly reduce the cost in comparison with the method that includes a power supplying and blocking circuit for each HDD.

Moreover, according to an embodiment of the present invention, each of the recording devices that are included in a single RAID group is affiliated to a power supplying group that is different than the RAID group. Thus, even if power supply to any power supply group is cut off, the RAID group can be maintained between the recording devices that are affiliated to the other power supply groups, thereby enabling to compensate for the power supply group that is subjected to cutoff of power supply and continue access to the entire system that includes the recording devices.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An apparatus for controlling power supply to recording devices of a redundant-array-of-independent-disks group, the apparatus comprising:

a power supply unit that supplies power for each of a plurality of power supply groups configured to supply the power to a first recording device that belongs to a first redundant-array-of-independent-disks group and a second recording device that belongs to a second redundant-array-of-independent-disks group, the second redundant-array-of-independent-disks group including recording devices different from those of the first redundant-array-of-independent-disks group; and a power-supply control unit that cuts off, when a malfunction occurs in a specific recording device, power supply to a power supply group that includes the specific recording device, wherein each of the power supply groups includes
- at least one recording device that belongs to the first redundant-array-of-independent-disks group; and
- at least one recording device that belongs to the second redundant-array-of-independent-disks group.

2. The apparatus according to claim 1, wherein
the power-supply control unit cuts off, when the malfunction occurs in the specific recording device, power supply to the power supply group that includes the specific recording device, while continuing power supply to other power supply groups that do not include the specific recording device.

3. A method of controlling power supply to recording devices of a redundant-array-of-independent-disks group, the method comprising:
supplying power for each of a plurality of power supply groups configured to supply the power to a first recording device that belongs to a first redundant-array-of-independent-disks group and a second recording device that belongs to a second redundant-array-of-independent-disks group, the second redundant-array-of-independent-disks group including recording devices different from those of the first redundant-array-of-independent-disks group; and
cutting off, when a malfunction occurs in a specific recording device, power supply to a power supply group that includes the specific recording device, wherein
each of the power supply groups includes
- at least one recording device that belongs to the first redundant-array-of-independent-disks group; and
- at least one recording device that belongs to the second redundant-array-of-independent-disks group.

4. The method according to claim 3, wherein
the cutting off includes cutting off, when the malfunction occurs in the specific recording device, power supply to the power supply group that includes the specific recording device, while continuing power supply to other power supply groups that do not include the specific recording device.

* * * * *